No. 819,427. PATENTED MAY 1, 1906.
W. HARTILL-LAW.
CAR AXLE.
APPLICATION FILED NOV. 22, 1904. RENEWED SEPT. 15, 1905.

WITNESSES:
INVENTOR.
Wm. Hartill-Law
BY
Ridout & Maybee
ATTORNEYS

UNITED STATES PATENT OFFICE.

WILLIAM HARTILL-LAW, OF TORONTO, CANADA.

CAR-AXLE.

No. 819,427.  Specification of Letters Patent.  Patented May 1, 1906.

Application filed November 22, 1904. Renewed September 15, 1905. Serial No. 278,595.

*To all whom it may concern:*

Be it known that I, WILLIAM HARTILL-LAW, of the city of Toronto, in the county of York, Province of Ontario, Canada, have invented certain new and useful Improvements in Car-Axles, of which the following is a specification.

The object of my invention is to construct a car-axle which will permit of one wheel rotating at a different rate of speed from the other, thus preventing slipping friction on the rails while the wheels are passing around curves or when one wheel happens to be of a different diameter to the other; and it consists, essentially, in forming the axle in two parts, the end of one being made revoluble within the end of the other and locked therein in the manner hereinafter more specifically described and then definitely claimed.

Figures 2, 3:
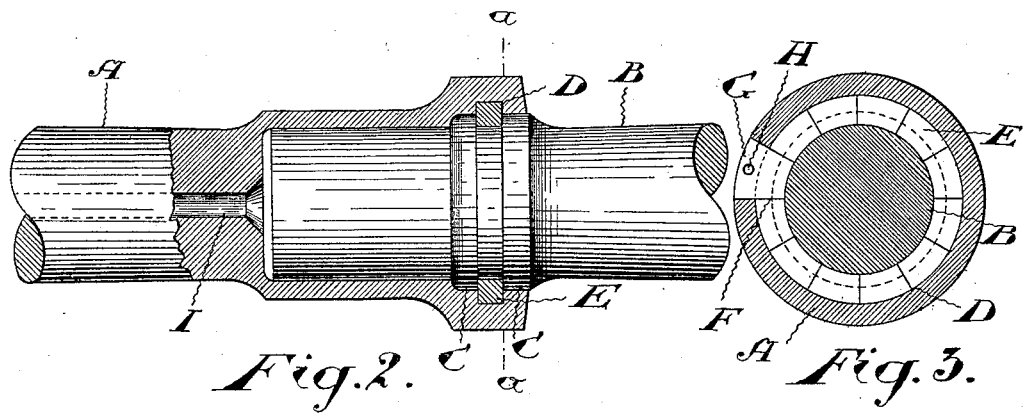
Figure 1:
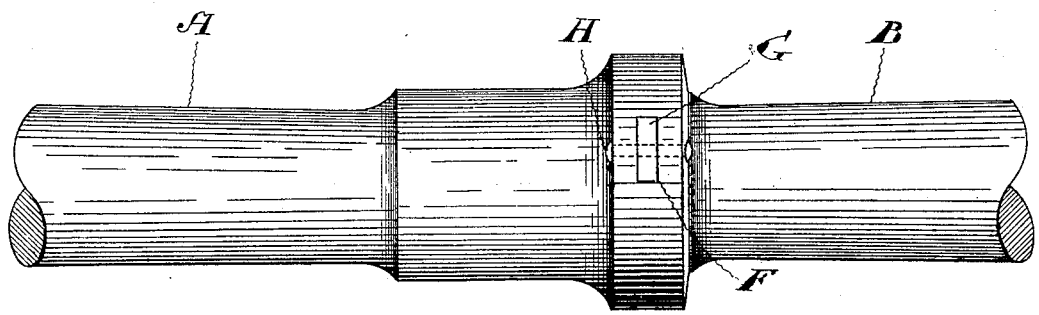

Figure 1 is an outside view of part of a standard axle provided with my improvements. Fig. 2 is a sectional elevation of the same. Fig. 3 is a cross-section of the same on the line $a\,a$ in Fig. 2.

In the drawings like letters of reference indicate corresponding parts in the different figures.

The axle is of a compound type, consisting of two parts A and B, the end of the part A being slightly enlarged and the end of the part B journaled therein. The part B of the axle has two collars C formed thereon, separated by a space. The end of the axle A is further enlarged to fit over the collars C and has a recess formed therein to form, with the space between the collars, an annular channel D. The parts of the axle are locked together by fitting a metal ring into this channel. While it is possible to flow molten metal into this channel to form the ring, yet it is doubtful whether such an arrangement would be commercially practicable. I therefore prefer to form a ring of segments E and to introduce these segments into the channel through a slot F, formed in the axle A. This slot may be of the same length or slightly longer than the segments E. After all the segments have been introduced the slot is closed by means of a locking-piece G, suitably held in place by a pin or rivet H. This locking-piece may be either independent or formed as part of one of the segments E, as shown in the drawings. The axle having been assembled as described may be disconnected by removing the locking-piece G and then removing the segments E and the locking-ring, one by one, through the slot F, when the parts of the axle may be readily separated. Sufficient space is left between the end of the axle B and the end of its journal for a lubricant, which may be introduced through a hole I, bored through the axle, to any convenient point.

The advantages of my invention are manifold and obvious. It will be seen that it provides means whereby one wheel may travel faster than the other wheel. This entirely prevents skidding under all circumstances, as if one wheel happens to be of less diameter than the other the one is enabled to make a greater number of revolutions to compensate for the lack in diameter, and when the axle is passing around a curve one wheel by making a greater number of revolutions than the other compensates for the difference in length of the two rails. As skidding or slip is entirely avoided, the consequent torsional strain on the axle is also avoided. A saving in power, and consequently in cost, is obtained, as both wheels roll on the rails, and the friction caused by skidding is entirely avoided. The use of my invention will also reduce the cost of repairs to both rolling-stock and track. It will reduce the danger of the derailment of trains and consequent loss of life and property when running around curves, as the wheels when rolling along the outer rail do not have the same tendency to climb the rail as when the wheel is skidding, as on the end of an ordinary axle. The reduction of friction will permit of the increasing speed of trains without increase in the cost of traction. The life of the axle will also be increased by the elimination of the torsional stress constantly occurring in ordinary axles.

What I claim as my invention is—

1. An axle comprising two parts, one journaled within the other, in combination with a complete metal ring fitted in an annular flat-sided channel formed partly in one part of the axle and partly in the other, substantially as described.

2. An axle comprising two parts, one journaled within the other, an annular channel being formed partly in one part and partly in the other, and a slot cut in the outer part communicating with the said channel, in combination with a ring completely filling the channel and formed in segments of an annulus insertible through the said slot, substantially as described.

3. An axle comprising two parts, one journaled within the other, an annular channel being formed partly in one part and partly in the other, and a slot cut in the outer part communicating with the said channel, in combination with a ring fitting the channel and formed in segments insertible through the said slot; and a locking-piece secured in the said slot, substantially as described.

4. An axle comprising two parts, one journaled within the other, an annular channel being formed partly in one part and partly in the other, and a slot cut in the outer part communicating with the said channel, in combination with a ring fitting the channel and formed in segments insertible through the said slot; and a locking-piece secured in the said slot and formed as part of one of the segments of the ring, substantially as described.

5. An axle formed in two parts, the end of one journaled within the end of the other, the inner part having collars integral therewith, having a space between them, and the outer part an annular recess forming with the space between the collars an annular channel, in combination with a metal ring completely filling said channel, substantially as described.

6. An axle formed in two parts, the end of one journaled within the end of the other, the inner part having collars integral therewith, having a space between them, and the outer part an annular recess forming with the space between the collars an annular channel, in combination with a ring fitting the channel and formed in segments insertible through the said slot; and a locking-piece secured in the said slot and formed as part of one of the segments of the ring, substantially as described.

Toronto, November 12, 1904.

WILLIAM HARTILL-LAW.

In presence of—
J. EDW. MAYBEE,
P. R. JONES.